United States Patent
Fujimine et al.

(10) Patent No.: US 6,846,259 B2
(45) Date of Patent: Jan. 25, 2005

(54) HYDRAULIC CONTROL SYSTEM FOR AUTOMATIC TRANSMISSION

(75) Inventors: Takuya Fujimine, Anjo (JP); Akira Fukatsu, Anjo (JP); Kazuyuki Noda, Anjo (JP); Masahiko Ando, Anjo (JP); Kazutoshi Nozaki, Toyota (JP); Toshiki Kanada, Toyota (JP)

(73) Assignees: Aisin Aw Co., Ltd. (JP); Toyota Jidosha Kabushiki Kaisha (JP)

( * ) Notice: Subject to any disclaimer, the term of this patent is extended or adjusted under 35 U.S.C. 154(b) by 2 days.

(21) Appl. No.: 10/456,961

(22) Filed: Jun. 9, 2003

(65) Prior Publication Data

US 2004/0038765 A1 Feb. 26, 2004

(30) Foreign Application Priority Data

Jun. 28, 2002 (JP) ........................................ 2002-191523

(51) Int. Cl.⁷ .............................................. F16H 61/06
(52) U.S. Cl. ........................................ 475/121; 475/128
(58) Field of Search ................................ 475/121, 122, 475/123, 127, 128; 477/127, 130, 131, 138, 160

(56) References Cited

U.S. PATENT DOCUMENTS 4,829,853 A * 5/1989 Sakaguchi ................... 477/127
5,573,478 A * 11/1996 Tsukamoto et al. ......... 477/130

FOREIGN PATENT DOCUMENTS

JP 2001-116134 4/2001

* cited by examiner

*Primary Examiner*—Sherry Estremsky
(74) *Attorney, Agent, or Firm*—Lorusso, Loud & Kelly

(57) ABSTRACT

A hydraulic control system for an automatic transmission includes a 3-4 shift valve that outputs a source pressure through a first path for shift speeds lower than a fourth shift speed established by directly connecting an input shaft with an output shaft of the automatic transmission, i.e., third shift speed. The hydraulic control system further includes a clutch apply control valve that outputs a source pressure through a second path at a shift speed higher than the fourth shift speed, i.e., fifth speed. The 3-4 shift valve and the clutch apply control valve serve to interrupt supply of the source pressure through the first path and the second path, respectively, in the fourth speed or the lock-up stage.

12 Claims, 3 Drawing Sheets

FIG.2

OPERATION STATE OF AUTOMATIC TRANSMISSION MECHANISM

| | CLUTCH | | | BRAKE | | | | OWC | | | SOLENOID | | | | |
|---|---|---|---|---|---|---|---|---|---|---|---|---|---|---|---|
| | C-1 | C-2 | C-3 | B-1 | B-2 | B-3 | B-4 | F-1 | F-2 | F-3 | S1 | S2 | SR | SL1 | SL2 |
| P | × | × | × | × | × | × | × | × | × | × | ((○)) | × | × | × | ○ |
| REV | × | × | ○ | (○) | × | × | ○ | ○ | × | × | ((○)) | × | × | × | ○ |
| N | × | × | × | × | × | × | × | × | × | × | ((○)) | × | × | × | ○ |
| 1ST | ○ | × | × | × | × | × | (○) | × | × | ○ | ○ | ×(×) | ×(×) | × | ○(×) |
| 2ND | ○ | × | × | × | (○) | ○ | × | ○ | ○ | × | ○ | ○(○) | ×(○) | × | ○ |
| 3RD | ○ | × | ○ | (○) | × | ● | × | ○ | × | × | × | ○(○) | ×(×) | × | ○(×) |
| 4TH | ○ | ○ | ● | × | × | ● | × | × | × | × | × | × | × | × | ○ |
| 5TH | × | ○ | ○ | ○ | × | ● | × | × | × | × | × | × | ○ | ○ | × |
| N-D SHIFTING | ×-○ | × | × | × | ×-○ | × | × | × | × | ×-○ | ○ | × | ○ | ○-× | ○-× |
| 4-5 SHIFTING | ○-× | ○ | ○ | ×-○ | × | ○ | × | × | × | × | × | ○ | ×-○ | ○-× | |

(○) UNDER ENGINE BRAKING CONTROL
● ENGAGED BUT NO TRANSMISSION OF TORQUE
× DISENGAGED

○ ON   × OFF
((○)) ELECTRICITY IS APPLIED
(○)(×) UNDER ENGINE BRAKING CONTROL

HYDRAULIC CONTROL SYSTEM FOR AUTOMATIC TRANSMISSION

CROSS-REFERENCE TO RELATED APPLICATION

This application claims, under 35 USC 119, priority of Japanese Application No. 2002-191523 filed Jun. 28, 2002.

INCORPORATION BY REFERENCE

The disclosure of Japanese Patent Application No. 2002-191523 filed on Jun. 29, 2002 including the specification, drawings and abstract are incorporated herein by reference in its entirety.

BACKGROUND OF THE INVENTION

1. Field of Invention

The present invention relates to a hydraulic control system for an automatic transmission. More specifically, the present invention relates to a hydraulic control system for an automatic transmission, which cuts supply of the source pressure used for engaging a brake in a lock-up stage where an input shaft and an output shaft are directly connected.

2. Description of Related Art

In a conventional hydraulic control system for an automatic transmission (hereinafter simply "hydraulic control system") a plurality of shift valves are selectively changed by shift solenoid valves responsive to operation of a shift lever. Such a hydraulic control system includes a plurality of friction engagement elements including clutches and brakes. The friction engagement elements corresponding to the respective shift speeds may be engaged/disengaged to change the shift stage so as to establish the required speed.

In the conventional automatic transmission, shifting may be performed by engaging one friction engagement element, while disengaging another of the friction engagement elements, i.e., a clutch-to-clutch shift. In this case, linear solenoid valves and control valves corresponding to the respective friction engagement elements supply regulated engagement pressures to the hydraulic servos which operate the respective friction engagement elements to effect the aforementioned shift. However, the conventional transmission requires a large number of relatively large size linear solenoid valves. Accordingly, the structure of the conventional hydraulic control system is large, complicated and costly.

The size and cost of the hydraulic control system may be reduced by reducing the number of linear solenoid valves and control valves, that have been provided for the respective hydraulic servos of a plurality of friction engagement elements, to a single pair. The resultant structure of the hydraulic control system is thus simplified and, accordingly, a cost reduction is realized.

Referring to the hydraulic control system for an automatic transmission 10 as shown in FIG. 1, in the 5th speed, for example, the aforementioned single pair of a linear solenoid valve and a control valve are operated to supply the engagement pressure in the 1st to 3rd shift speeds and 5th speed wherein the brakes are engaged as shown in FIG. 2. They are also operated to cutoff supply of the engagement pressure and thereby disengage the brakes in 4th speed where the input shaft and the output shaft of the automatic transmission are directly connected. However, it is necessary to provide for the possibility that a failure may occur in those valves such as by valve sticking. Provision for such a failure may complicate the structure of the circuit, and also complicate any modification aimed at reduction of the size of the hydraulic control system.

SUMMARY OF THE PRESENT INVENTION

It is therefore an object of the present invention to provide a hydraulic control system for an automatic transmission, which has only a single pair of a linear solenoid valve and a control valve and, therefore, a more compact structure. The hydraulic control system is capable of reliably cutting off supply of the engagement pressure to the brake even if a failure occurs in the linear solenoid valve.

According to a first aspect of the present invention, with a simple structure wherein the linear solenoid valves and the control valves are grouped, the source pressure can be selectively obtained from either a first shift valve or a second shift valve so as to engage a required friction engagement element. This makes it possible to engage the friction engagement element for applying engine braking in relatively lower shift speeds and to engage the friction engagement element for establishing a shift speed in a relatively higher shift speed. In a lock-up stage, for example, if the first shift valve is in a second position and the second shift valve is in a first position, supply of the source pressure from the first and the second shift valves is interrupted. As a result, the friction engagement elements used for shifting may be reliably disengaged. As the output port can be selectively closed in accordance with the control pressure, the output of the engagement pressure in the lock-up stage is interrupted even if the source pressure for the engagement pressure is supplied to the control device owing to the failure in the first shift valve or the second shift valve. This allows the hydraulic control system to operate with fail-safe control.

In a hydraulic control system according to the first aspect of the invention, even if the source pressure for the engagement pressure is undesirably supplied owing to a failure in the first or the second shift valve, the output of the engagement pressure in the lock-up stage can be interrupted by the control device. This provides the hydraulic control system with a further fail-safe feature.

In a hydraulic control system according to the first aspect of the invention, the position of the second shift valve is selected by the first solenoid valve that supplies/interrupts supply of the signal pressure. Control of the ON/OFF operation of the first solenoid valve makes it possible to select between the first shift speed and the second shift speed.

In a hydraulic control system according to the first aspect of the invention, the signal pressure for selecting the position of the second shift valve can be used for operating the third shift valve synchronously with the second shift valve, thus simplifying the circuit configuration.

In a hydraulic control system according to the first aspect of the invention, a shift speed higher than the first speed can be established by selecting a shift speed other than the first speed in the N-D control, for example, engaging the clutch for start of forward motion, making it possible to reduce the shock in starting forward.

In a hydraulic control system according to the first aspect of the invention, the reverse rotation of the output shaft can be regulated in neutral (N), thereby providing hill-holding.

In a hydraulic control system according to the first aspect of the invention, the source pressure for a predetermined shift speed higher than the first speed is supplied from the second shift valve, not from the first shift valve. Therefore, even if the solenoid valve becomes stuck, for example during engine braking in the forward second speed, the third shift valve operates to interrupt supply of the engagement pressure to the friction engagement element (B-4 and the like). This makes it possible to prevent an undesirable operation, for example, engine braking in the forward first speed under the engine braking control in the forward second speed.

In a hydraulic control system according to the first aspect of the invention, the source pressure for establishing the fifth speed is supplied from the second shift valve, not from the first shift valve. This makes it possible to engage the friction engagement element for applying engine braking in relatively lower speeds as well as to engage the friction engagement element for establishing the shift speed at relatively higher speeds.

According to the first aspect of the invention, even in the state where the shift lever is mistakenly set to the second range during running at high speeds in the third range, and the state of the first solenoid valve is changed accordingly, the source pressure can be supplied from the second shift valve. This avoids downshifting so as to hold the engine braking force in the third speed.

The first aspect of the invention allows the hydraulic control unit to have a simple and compact structure.

In a hydraulic control system according to the first aspect of the invention, as the predetermined shift speed is in a lock-up state, supply of the engagement pressure to the friction engagement element such as a brake can be reliably interrupted in spite of a valve failure.

A second aspect of the present invention provides a simple structure wherein the linear solenoid valves and the control valves are grouped, and the source pressure can be selectively obtained from either the first shift valve or the second shift valve for engagement of a required friction engagement element. This makes it possible to engage the friction engagement element for applying engine braking force in the relatively lower shift speeds and to engage the friction engagement element for establishing a shift speed at a relatively higher shift speed. In a lock-up stage, for example, if the first shift valve is in the second position and the second shift valve is in the first position, supply of the source pressure from the first and the second shift valves is interrupted. As a result, the friction engagement elements used for shifting may be reliably disengaged. As the output port can be selectively closed in accordance with the control pressure, the output of the engagement pressure in the lock-up stage is interrupted even if the source pressure for the engagement pressure is supplied to the control device owing to a failure in the first shift valve or the second shift valve. This allows the hydraulic control system to provide fail-safe control operation.

In a hydraulic control system according to the second aspect of the invention, even if the source pressure for the engagement pressure is undesirably supplied owing to a failure in the first or the second shift valve, the output of the engagement pressure in the lock-up stage can be interrupted by the control device. This provides the hydraulic control system with a another reliable fail-safe feature.

In a hydraulic control system according to the second aspect of the invention, the position of the second shift valve is selected by the first solenoid valve that supplies/interrupts supply of the signal pressure. Control of the ON/OFF operation of the first solenoid valve makes it possible to select the shift speed between the first shift speed and the second shift speed.

In a hydraulic control system according to the second aspect of the invention, the signal pressure for selecting the position of the second shift valve can be used for operating the third shift valve synchronously with the second shift valve. This may simplify the circuit configuration.

In a hydraulic control system according to the second aspect of the invention, a shift speed higher than the first speed can be established by selecting a shift speed other than the first speed under N-D control, for example, by engaging the clutch for taking off. This makes it possible to reduce the shock caused by starting forward.

In a hydraulic control system according to the second aspect of the invention, the reverse rotation of the output shaft can be regulated under the N control, providing a hill-holding effect.

In a hydraulic control system according to the second aspect of the invention, the source pressure for a predetermined shift speed higher than the first speed is supplied from the second shift valve, not from the first shift valve. Therefore, even if valve sticking occurs in the solenoid valve or the like, for example, under engine braking control in the forward second speed, the third shift valve reliably interrupts supply of the engagement pressure to the friction engagement element, e.g., B-4. This makes it possible to prevent undesirable operation, for example, the engine braking force of the forward first speed acting under engine braking control in the forward second speed.

In a hydraulic control system according to the second aspect of the invention, the source pressure for establishing the fifth speed is supplied from the second shift valve, not from the first shift valve. This makes it possible to engage the friction engagement element for applying the engine braking force in relatively lower speeds, as well as to engage the friction engagement element for establishing the shift speed in relatively higher speeds.

According to the second aspect of the invention, even if the shift lever is mistakenly set to the second range during running at high speeds in the third range, and the state of the first solenoid valve is changed accordingly, the source pressure can be supplied from the second shift valve. This avoids downshifting so as to hold the engine braking force in third speed.

The second aspect of the invention also allows the hydraulic control unit to have a simple and compact structure.

In a hydraulic control system according to the second aspect of the invention, as the predetermined shift speed is a lock-up stage, supply of the engagement pressure to the friction engagement element such as the brake can be reliably interrupted in spite of a valve failure.

BRIEF DESCRIPTION OF THE DRAWINGS

FIG. 2 is a table of operation states of the automatic transmission mechanism in drive (D) range.

DETAILED DESCRIPTION OF PREFERRED EMBODIMENTS

A preferred embodiment of the present invention will now be described with reference to the drawings.

Referring to the table in FIG. 2, each of the marks (O), ◆, and (X), in columns for CLUTCH, BRAKE, and ONE-WAY CLUTCH (OWC), represents an engaged state during engine braking, an engaged state not related to establishment of the shift speed, and a disengaged state, respectively. Each of the marks O and X in the SOLENOID column represents an ON state and an OFF state, and (O) and (X) in the same columns represents an ON state and an OFF state during engine braking. The mark <<O>> in the column having the heading SOLENOID represents the state resulting from turning ON the ignition key (application of electricity). The brake B-3 that is brought into engagement in the third speed (3RD), fourth speed (4TH) and fifth speed (5th) has a function that switches ON/OFF the one-way clutch F-2 in the state where no torque is transmitted. The brake B-3 is conceptually different from a brake that engages a rotating element such as a sun gear, carrier or ring gear in establishment of the shift speed.

An automotive automatic transmission generally includes a hydraulic control system 1 and an automatic transmission mechanism (gear mechanism) 10 providing 5 forward speeds and 1 reverse speed through control of the engagement of a plurality of friction engagement elements (for example, clutches C-1 to C-3, and brakes B-1 to B-4) based on the hydraulic control operations of the hydraulic control system 1.

Figure 1:
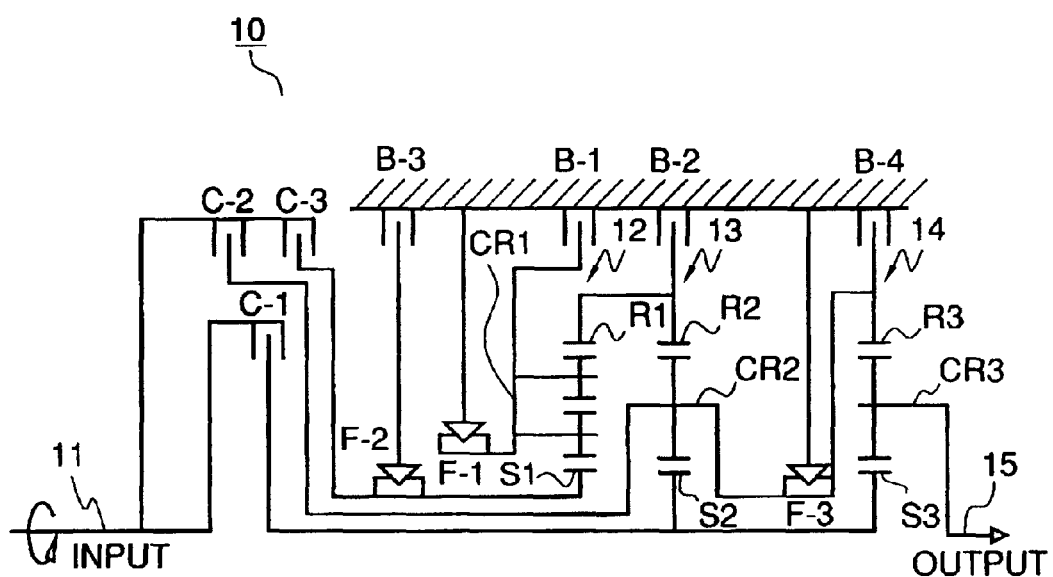
FIG. 1 is a schematic diagram representing an automatic transmission mechanism to which the present invention is applied.

Referring to FIG. 1, the automatic transmission mechanism 10 has an input shaft 11 and an output shaft 15. The automatic transmission mechanism 10 further includes a double pinion planetary gear unit 12 having a sun gear S1, a carrier CR1 and a ring gear R1, a simple planetary gear unit 13 having a sun gear S2, a carrier CR2 and a ring gear R2, and a simple planetary gear unit 14 having a sun gear S3, a carrier CR3 and a ring gear R3. Those gear units 12, 13 and 14 are disposed between the input shaft 11 and the output shaft 15. The automatic transmission mechanism 10 includes an inner clutch C-1 and outer clutches C-2 and C3 in parallel with each other, i.e., a double clutch, at the input side.

The clutch C-3 is connected to the sun gear S1, the rotation of which is limited to one direction by the one-way clutch F-1 that is engaged by locking the brake B-3. The rotation of the carrier CR1 in mesh with the sun gear S1 is limited to one direction by the one-way clutch F-1, and the carrier CR1 can be fixed by the brake B-1 serving to apply engine braking in first speed. The ring gear R1 in mesh with the carrier CR1 is connected to the ring gear R2 so as to be fixed by the brake B-2.

The clutch C-2 is connected to the carrier CR2 in mesh with the ring gear R2. The carrier CR2 is also connected to the ring gear R3. Rotation of the carrier CR2 and that of the ring gear R3 are limited to one direction by the one-way clutch F-3, and the carrier CR2 and the ring gear R3 can be fixed by the brake B-4. The clutch C-1 is connected to the sun gears S2 and S3. The sun gear S2 is in mesh (engaged) with the carrier CR2, and the sun gear S3 is in mesh with the carrier CR3. The carrier CR3 is in mesh with the ring gear R3 and is connected to the output shaft 15.

Referring to FIGS. 1 and 2, operations of the automatic transmission mechanism 10 will be described. As shown in FIG. 2, in the forward first speed (1ST), the clutch C-1 is engaged and the one-way clutch F-3 is activated with solenoid valve S1 ON, solenoid valve S2 OFF, a solenoid valve SR OFF, linear solenoid valve SL1 OFF, and linear solenoid valve SL2 ON. Then rotation of the input shaft 11 is transferred to the sun gear S3 via the clutch C-1, and the rotation of the ring gear R3 is limited to one direction by the one-way clutch F-3 so as to reduce the rotational speed of the carrier CR3. Accordingly, forward rotation in the forward first speed is output from the output shaft, thus establishing the forward first speed.

When engine braking is applied in forward first speed, that is, in the coasting state, the brake B-4 is locked in place of the one-way clutch F-3 such that the ring gear R3 is locked to prevent racing. Accordingly, the forward first speed is established.

In the forward second speed (2ND speed), the clutch C-1 is engaged and the brake B-3 is locked with the solenoid valves S1 and S2 ON, the solenoid valve SR OFF, the linear solenoid valve SL1 OFF, and the linear solenoid valve SL2 ON so as to actuate the one-way clutches F-1 and F-2. Then as shown in FIG. 1, the one-way clutch F-2 that is engaged by locking the brake B-3 limits the rotation of the sun gear S1 to one direction, and the one-way clutch F-1 limits the rotation of the carrier CR1 to one direction, as well as rotation of the ring gears R1 and R2. When the rotation of the input shaft is transferred to the sun gear S2 via the clutch C-1, the rotational speed of the carrier CR2 and that of the ring gear R3 are reduced. When the rotation of the input shaft 11 is further transferred to the sun gear S3 via the clutch C-1, the rotational speed of the carrier CR3 is reduced to slightly higher than the first shift speed owing to the sun gear S3 and the ring gear R3. Accordingly, the forward rotation in the second speed is output from the output shaft 15, that is, the automatic transmission mechanism 10 establishes the second speed.

When engine braking is applied in second speed (coasting), the brake B-2 is locked, instead of the one-way clutches F-1 and F-2, as shown in FIG. 2, so as to prevent the ring gears R1 and R2 from racing by locking same against rotation. Accordingly, the second speed is established as described above.

In the forward third speed (3RD), the clutches C-1 and C-3 are respectively engaged and the one-way clutch F-1 is actuated where the solenoid valve S1 is OFF, the solenoid valve S2 is ON, the solenoid valve SR is OFF, the linear solenoid valve SL1 is OFF, and the linear solenoid valve SL2 is ON, as shown in FIG. 2. Referring to FIG. 1, as the clutch C-3 is engaged, rotation is transferred to the sun gear S1, and the rotation of the carrier CR1 is limited to one direction by the one-way clutch F-1. Rotational speeds of the carriers CR2 and the ring gear R3 are reduced significantly owing to the sun gear S2 and the ring gear R2. When the rotation of the input shaft 11 is further transferred to the sun gear S3 via the clutch C-1, the rotational speed of the carrier CR3 is reduced to a speed that is slightly higher than the second speed. Accordingly, the forward rotation in the third shift speed is output from the output shaft 15, establishing third speed.

When engine braking is applied in the third speed, that is, coasting, the brake B-1 is locked, in place of the one-way clutch F-1, as shown in FIG. 2, so as to lock the carrier CR1 against rotation thereby preventing it from racing. This serves to establish third speed.

In fourth speed (4TH) where the input shaft 11 and the output shaft 15 of the automatic transmission mechanism 10 are directly connected, the clutches C-1 and C-2 are respectively engaged where the solenoid valves S1, S2 and SR are OFF, the linear solenoid valve SL1 is OFF, and the linear solenoid valve SL2 is ON, as shown in FIG. 2. Referring to FIG. 1, the engagement of the clutch C-2 serves to transfer rotation to the carrier CR2 and the ring gear R3, as well as to the sun gear S3, via the clutch C-1. Then the sun gear S3 and the ring gear R3 serve to rotate the carrier CR3 such that the output shaft 15 outputs the rotation at the fourth speed.

In fifth speed (5TH), the clutches C-2 and C-3 are respectively engaged, and the brake B-1 is locked where the solenoid valves S1 and S2 are OFF, the solenoid valve SR is ON, the linear solenoid valve SL1 is ON, and the linear solenoid valve SL2 is OFF. Engagement of the clutch C-3 transfers the rotation to the sun gear S1, and the brake B-1 serves to prevent the carrier CR1 from rotating, so as to reduce the rotational speeds of the ring gears R1 and R2. Engagement of the clutch C-2 transfers the rotation to the carrier CR2 and the ring gear R3 so as to accelerate the rotational speeds of the sun gears S2 and S3. The sun gear S3 and the ring gear R3 serve to accelerate the rotational speed of the carrier CR3 such that the output shaft 15 outputs the forward rotation at fifth speed.

In the first reverse speed (REV), the clutch C-3 is engaged and the brake B-4 is locked where the solenoid valve S1 is ON, the solenoid valves S2 and SR are OFF, the linear solenoid valve SL1 is OFF, the linear solenoid valve SL2 is ON and the one-way clutch F-1 is activated. Referring to FIG. 1, engagement of the clutch C-3 inputs rotation to the sun gear S1, and the one-way clutch F-1 restricts the rotation of the carrier CR1 to one direction. The sun gear S1 and the carrier CR1 serve to reduce the rotational speeds of the ring gears R1 and R2. The brake B-4 that has been locked blocks rotation of the carrier CR2 and that of the ring gear R3. Then the carrier CR2 and of the ring gear R2 cause reverse rotation of the sun gears S2 and S3, and the rotation of the carrier CR3 is also reversed. Accordingly the output shaft 15 outputs the reverse rotation in the first reverse speed.

When engine braking force is applied in first reverse speed, that is, coasting, the brake B-1 is locked, in place of the one-way clutch F-1, as FIG. 2 shows, so as to prevent the carrier CR1 from racing. The first reverse speed is thus established as described above.

In neutral (N) range, the clutches, brakes and one-way clutches are all in the disengaged or deactivated state where the solenoid valve S1 is ON, the solenoid valves S2 and SR are OFF, the linear solenoid valve SL1 is OFF, and the linear solenoid valve SL2 is ON. As a result, the rotation of the input shaft 11 cannot be transferred to the output shaft 15.

Figure 3:
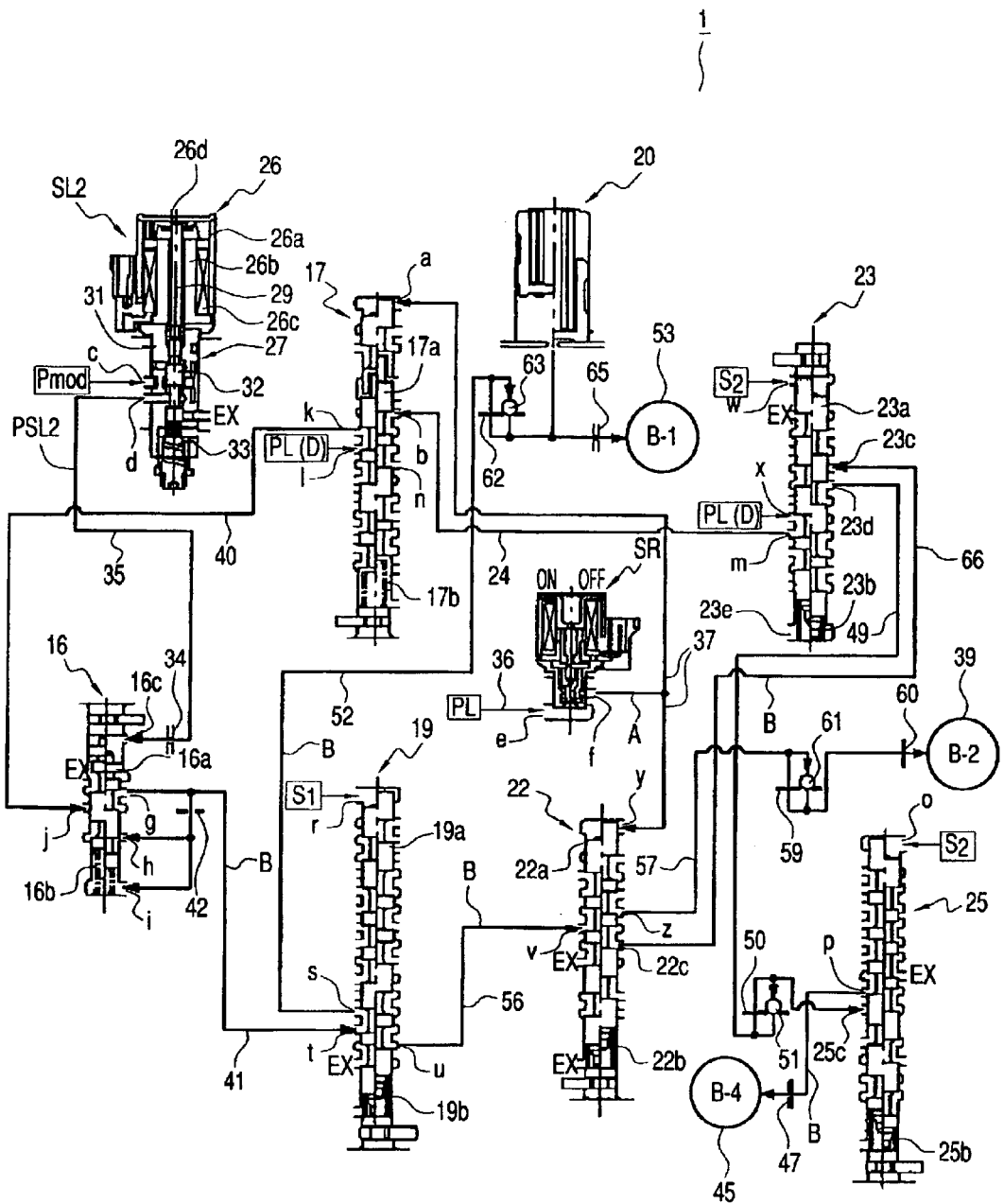
FIG. 3 is a schematic circuit diagram of a hydraulic control system for an automatic transmission in accordance with the present invention.

The hydraulic control system 1 of the present invention will now be described referring to FIG. 3. Although FIG. 3 represents the hydraulic control system 1 schematically, the hydraulic control system 1 actually includes many additional valves and oil passages, for example, hydraulic servos for controlling the respective engagement states of a plurality of friction engagement elements, lock-up clutches, and control devices for controlling the lubricating circuits and the like. The term "EX" in FIG. 3 represents a drain port.

Referring to FIG. 3, the hydraulic control system 1 includes a linear solenoid valve SL2, a brake control valve 16, a clutch apply control valve (second shift valve) 17, a 2-3 shift valve 19, a B-1 accumulator 20, a solenoid valve (first solenoid valve) SR, a sequence valve (third shift valve) 22, a 3-4 shift valve (first shift valve) 23, and a 1-2 shift valve 25.

The linear solenoid valve SL2 is a normally open solenoid valve, has a solenoid portion 26 and a pressure control valve portion 27, and becomes ON upon receipt of a control signal so as to control the solenoid pressure. In the solenoid portion 26, a coil 26c is interposed between a yoke 26a and a stator core 26b, and a shaft 29 that abuts a spool 30 of the pressure control valve portion 27 is slidably provided within a center hole 26d. The pressure control valve portion 27 is formed of a valve body 31 and a spool 32 that is slidably mounted therein. As shown in FIG. 3, the spool 32 is urged upward by a spring 33. The valve body 31 includes a port c to which a modulator pressure Pmod is input, and a port d that outputs a control pressure PSL2 for controlling the brake control valve 16 in accordance with the modulator pressure Pmod. The port d communicates with a control oil chamber 16c of a brake control valve 16 via an oil passage 35.

The linear solenoid valve SL2 and the brake control valve 16 constitute a control device of the present invention having a compact and simple structure.

The solenoid valve SR is a normally closed solenoid valve and operates responsive to receipt of a control signal so as to supply a line pressure (source pressure) as a signal pressure A when ON, and to cut supply of the line pressure when OFF. The solenoid valve SR includes a port e to which the line pressure PL is input via the oil passage 36, and a port f from which the signal pressure A is output to an oil passage 37 when the solenoid valve SR is ON. The solenoid valve SR outputs the signal pressure A to the clutch apply control valve 17 and the sequence valve 22 so as to operate the valves 17, 22 synchronously.

The line pressure is obtained by adjusting the oil pressure from an oil pump using a primary regulator valve (not shown). The range pressure is obtained by inputting the line pressure to the manual valve that is positioned by operation of a shift member such as a shift lever and a switch (not shown).

The brake control valve 16 includes a spool 16a that is movable up and down in FIG. 3, a spring 16b that urges the spool 16a upward, a control oil chamber 16c that receives supply of the control pressure PSL2 from the linear solenoid valve SL2 via the oil passage 35 and the orifice 34, an input port j to which the D range pressure (source pressure) is supplied from the clutch apply control valve 17 via the oil passage 40, an output port g that outputs an engagement pressure B, obtained by adjusting the D range pressure based on the control pressure PSL2, to the oil passage 41, and control oil chambers h, i where the engagement pressure B output from the output port g is fed back through the orifice 42. The brake control valve 16 adjusts the D range pressure in a first path output from the clutch apply control valve 17, or the D range pressure in a second path output from the input port l of the control valve 17 via the output port k. The adjusted pressure is then output to the respective hydraulic servos 53, 39, 45 for the brakes B-1, B-2 and B-4, respectively.

The clutch apply control valve 17 includes a spool 17a, a spring 17b that urges the spool 17a upward, a port a through which the signal pressure A output in the ON state of the solenoid valve SR is supplied via the oil passage 37, an input port l to which the D range pressure is supplied via the shift valve when the manual shift valve (not shown) is in the D range, for example, an output port k from which the D range pressure is output to the oil passage 40 as shown in the left part of FIG. 3, an input port b in communication with an output port m of the 3-4 shift valve 23, to which the D range pressure of the first path is supplied, and a port n from which the D range pressure input to the input port l is output to the clutch C-1 (not shown) as shown in the right half of FIG. 3.

The 1-2 shift valve 25 includes a spool 25a, a spring 25b that urges the spool 25a upward, a port o to which a signal pressure (S2) output in the OFF state of the solenoid valve S2 (not shown) is supplied as FIG. 2 shows, an output port p that supplies an engagement pressure B to the hydraulic servo 45 for the brake B-4 via an orifice 47, and an input port 25c to which the engagement pressure B output from the sequence valve 22 through the 3-4 shift valve 23 via the oil passage 49 is supplied. The oil passage 49 is connected to an orifice 50 and a check valve 51. The engagement pressure B is supplied to the input port 25c via the orifice 50. The check valve 51 allows the oil pressure from the 3-4 shift valve 23, to act on the 1-2 shift valve 25, and to prevent the oil pressure from acting on those valves in the reverse direction.

The 2-3 shift valve 19 includes a spool 19a that is movable up and down, a spring 19b that urges the spool 19a upward, a port r to which a signal pressure (S1) output in the OFF state of the solenoid valve S1 (not shown) is supplied as shown in FIG. 2, an input port t to which the engagement pressure B is supplied from the brake control valve 16 via the oil passage 41, an output port s that outputs the engagement pressure B to the hydraulic servo 53 for the brake B-1 via the oil passage 52 in the left half position, and an output port u that outputs the engagement pressure B to an input port v of the sequence valve 22 via the oil passage 56 in the right half position. The oil passage 52 is connected to an orifice 62, a check valve 63 and an orifice 65. The check valve 63 prevents the engagement pressure B from the 2-3 shift valve 19 from acting on hydraulic servo 53, and allows drain of the engagement pressure B from the hydraulic servo 53.

The solenoid valve S1 is a normally open solenoid valve, and outputs the signal pressure (S1) in its OFF state and to cut supply of the signal pressure (S1) in its ON state. The solenoid valve S2 is a normally closed solenoid valve, and outputs the signal pressure (S2) in its OFF state, and cuts supply of the signal pressure (S2) in its ON state.

The 3-4 shift valve 23 includes a spool 23a that is movable up and down, a spring 23b that urges the spool 23a upward, a port w to which the signal pressure (S2) output in the OFF state of the solenoid valve S2 is supplied as shown in FIG. 2, an input port x to which the D range pressure is supplied, an output port m that outputs the D range pressure supplied to the input port x to the oil passage 24 in the left half position, an input port 23c to which the engagement pressure B is input from the sequence valve 22 via the oil passage 66, and an output port 23d that supplies the engagement pressure B for the input port 23c to the input port 25c of the 1-2 shift valve 25 via the oil passage 49 in the left half position.

The sequence valve 22 includes a spool 22a that is movable up and down, a spring 22b that urges the spool 22a upward, a port y to which the signal pressure A is supplied via an oil passage 37 in the ON state of the solenoid valve SR, an input port v to which the engagement pressure B is supplied from the output port u of the 2-3 shift valve 19, an output port z that outputs the engagement pressure B to an hydraulic servo 39 for the brake B-2 via the oil passage 57 in the left half position, and an output port 22c that outputs the engagement pressure B to the 3-4 shift valve 23 via the oil passage 66 in the right half position. The engagement pressure B from the output port z is supplied to the hydraulic servo 39 via the orifices 59, 60 and is drained from the hydraulic servo 39 through the orifice 59 and a check valve 61 disposed in parallel therewith.

B-1 accumulator 20 is connected between a check valve 63 and an orifice 65 in the oil passage 52, so as to reduce the shock caused by the engagement of the brake B-i, thus suppressing hydraulic vibration.

The operation of the hydraulic control system 1 will now be described. When an engine (not shown) is driven to actuate an oil pump (not shown) with the shift lever set in N range or P range, a line pressure PL adjusted by a primary regulator valve (not shown) is generated and supplied to the port e of the solenoid valve SR of the normal close type. In the aforementioned case, since the solenoid valve SR is in its OFF state as shown in FIG. 2, the signal pressure A is not output from the port f. Then a modulator pressure Pmod is supplied from the modulator valve (not shown) to the linear solenoid valve SL2 of the normal open type.

When the shift lever is moved to its D range position, the N-D squat control is started. In the aforementioned control, as shown in FIG. 2, the ON state of the linear solenoid valve SL1 (not shown) is switched to the OFF state. The linear solenoid valve SL2 is switched from its ON state to its OFF state, and the solenoid valve SR is switched to its ON state. The linear solenoid valve SL2 of the normal open type is once closed and then gradually opened so that the modulator pressure Pmod supplied to the port c is output to the oil passage 35 from the port d under the increasing control pressure PSL2. This allows the control pressure PSL2 to be supplied to the control oil chamber 16c so as to gradually move the spool 16c downward.

The D range pressure in the first path, that is the line pressure, is supplied to the input port x in the 3-4 shift valve 23. As the solenoid valve S2 is OFF, as shown in FIG. 2, the signal pressure (S2) is supplied to the port w, and the back pressure from the 1-2 shift valve 25 to the input port 23c brings the 3-4 shift valve 23 into the left half position. Therefore, the input port x communicates with the output port m so as to output the D range pressure in the first path.

The solenoid valve SR in its ON state outputs the signal pressure A, in accordance with the line pressure PL supplied to the port e, and supplies the signal pressure A to the port a of the clutch apply control valve 17 and the port y of the sequence valve 22, respectively. Therefore the clutch apply control valve 17 is brought into the left half position where the D range pressure, of the second path supplied to the input port 1, is output from the output port k to the oil passage 40 while interrupting communication between the input port b and the output port k. The D range pressure of the second path is supplied to the input port j of the brake control valve 16 as the source pressure for engagement of the brake B-2.

The control pressure PSL2 is supplied to the control oil chamber 16c of the brake control valve 16 such that the engagement pressure B, derived from adjusting the D range pressure of the second path with the movable spool 16a, is output from the output port g to the oil passage 41, and is supplied to the oil chambers h and i as the feedback pressure. As the solenoid valve S1 is in its ON state (see FIG. 2), where no signal pressure (S1) is supplied to the port r, the 2-3 shift valve 19 is brought into the right half position. The engagement pressure B supplied to the input port t via the oil passage 41 is output from the output port u to the oil passage 56 and supplied to the input port v of the sequence valve 22.

In the above case, as the signal pressure A is supplied to the port y to bring the sequence valve 22 into its left half position, the input port v is in communication with the output port z. Then the engagement pressure B is output from the output port z to the oil passage 57 and supplied to the hydraulic servo 39 for the brake B-2 via the orifices 59, 60. This makes it possible to establish the engagement of the brake B-2. The signal pressure S2 is supplied to the port o of the 1-2 shift valve 25 as the solenoid valve S2 is in its OFF state. This brings the 1-2 shift valve 25 into its right half position. However, the engagement pressure B is not supplied to the input port 25c, and thus, the brake B-4 is not engaged. At this time, the forward second speed is established by directly controlling engagement of the clutch C-1 (not shown).

Under the N-D squat control, the D range pressure of the second path from the clutch apply control valve 17 is used as the source pressure for the engagement pressure B for the brake B-2. This makes it possible to establish the forward second speed by engaging the brake B-2 under direct control of the clutch C-1, reducing the shock upon starting the vehicle in motion. Without squat control a shift from P or N into first speed would cause a shift shock because of the high torque of first speed. In squat control, upon shifting into D range from P or N range, the transmission shifts into a high gear speed for a moment and then shifts into first gear speed.

With engine braking in the forward first speed, the hydraulic control system 1 is operated as described below. Upon start of the engine braking control, the linear solenoid valves SL1, SL2 and the solenoid valve SR are switched OFF. The modulator pressure Pmod supplied to the port c of the linear solenoid valve SL2 is output as the control pressure PSL2 from the port d to the oil passage 18. The control pressure PSL2 is supplied to the control oil chamber 16c of the control valve 16, and then the spool 16a moves down so that the brake control valve is brought into its right half position.

The D range pressure in the first path is supplied to the input port x of the 3-4 shift valve 23, and the signal pressure S2 based on the OFF state of the solenoid valve S2 is supplied to the port w of the 3-4 shift valve 23. The sum of the oil pressure supplied to the lower port 23e and the force of the spring 23b overcomes the signal pressure S2. Accordingly, the 3-4 shift valve 23 is in its left half position. As a result, the input port x is put in communication with the output port m from which the D range pressure of the first path is output.

As the solenoid valve SR is in its OFF state, the signal pressure A is not output. Accordingly, both the clutch apply control valve 17 and the sequence valve 22 are in the right half positions. The clutch apply control valve 17 outputs the D range pressure of the first path, supplied to the input port b, through the output port k to the oil passage 40.

The brake control valve 16 in its right half position outputs the D range pressure of the first path, supplied from the control valve 17 to the input port j, as the engagement pressure B to the oil passage 41 from the output port g. The brake control valve 16 further supplies the pressure to the oil chambers h, i as the feedback pressure. Then the solenoid valve S1 of the 2-3 shift valve 19 becomes ON (see FIG. 2) and the signal pressure S1 is not supplied to the port r. As the spool 19a is not moved down, the 2-3 shift valve 19 is kept in its right half position. The engagement pressure B supplied from the oil passage 41 to the input port t is output from the output port u to the oil passage 56 and supplied to the input port v of the sequence valve 22.

The signal pressure A is not supplied to the port y of the sequence valve 22 when the solenoid valve SR is in its OFF state. The sequence valve 22, therefore, is in its right half position. The engagement pressure B supplied to the input port v is output from the output port 22c to the oil passage 66 and further supplied to the input port 23c of the 3-4 shift valve 23. As the 3-4 shift valve 23 is in its left half position, the engagement pressure B is output to the oil passage 49 via the output port 23d, and further supplied to the input port 25c of the 1-2 shift valve 25 via the orifice 50 and the check valve 51.

Due to the signal pressure S2 supplied to the port o, the 1-2 shift valve 25 is kept in its right half position. The input port 25c is brought into communication with the output port p from which the engagement pressure B is output and is further supplied to the hydraulic servo 45 for the brake B-4 via the orifice 47. Then engagement of the clutch C-1 (not shown) is directly controlled so that the forward first speed is established with engine braking control.

The hydraulic control system 1 is operated under engine braking control in the forward second speed as will now be described. Under the engine braking control, the linear solenoid valves SL1 and SL2 are OFF, and the solenoid valve SR becomes ON. The linear solenoid valve SL2 is gradually brought into its ON state so that the control pressure PSL2, that has been gradually increased, is output from the port d to the oil passage 35. As a result, the spool 16a of the brake control valve 16 is gradually moved down.

The D range pressure of the first path is supplied to the input port x of the 3-4 shift valve 23, but the signal pressure S2 is not supplied to the port w because of the ON state (see FIG. 2) of the solenoid valve S2. Accordingly, the 3-4 shift valve 23 is in its left half position. The input port x is brought into communication with the output port m so that the D range pressure of the first path is output to the oil passage 24.

As the solenoid valve SR of the normal close type is kept in its ON state at this time, the signal pressure A in accordance with the line pressure PL is output. Accordingly, both the clutch apply control valve 17 and the sequence valve 22 are in the left half positions. Communication between the input port b and the output port k of the clutch apply control valve 17 is interrupted so that the D range pressure of the first path is not output to the oil passage 40. As the input port 1 is in communication with the output port k, the D range pressure of the second path is output from the output port k to the oil passage 40.

The brake control valve 16 serves to adjust the D range pressure in the second path using the spool 16a in accordance with the control pressure PSL2 supplied to the control oil chamber 16c. The adjusted D range pressure is then output from the output port g to the oil passage 41 as the engagement pressure B. As the solenoid valve S1 is in its ON state, the signal pressure S1 is not supplied to the port r. Accordingly, the 2-3 shift valve 19 is kept in its right half position. The engagement pressure B supplied to the input port t is output from the output port u to the oil passage 56, and further supplied to the input port v of the sequence valve 22.

As the signal pressure A is supplied to the port y, the sequence valve 22 is in its left half position. The engagement pressure B supplied to the input port v is output from the output port z to the oil passage 57, and further supplied to the hydraulic servo 39 for the brake B-2 via the orifices 59, 60. The brake B-2 is thus engaged. At this moment, the clutch C-1 (not shown) is engaged under direct control and the brake B-3 is further engaged by the engagement pressure supplied through the valve (not shown). Therefore, the forward second speed is established with engine braking control.

The solenoid valve SR is OFF under the engine braking control in the forward first speed, and becomes ON under the engine braking control in the forward second speed. Even if a failure occurs, such as a stuck valve when the solenoid valve S2 is in its OFF state under engine braking control in the forward second speed, supply of the engagement pressure B to the brake B-4 may be reliably blocked by the sequence valve 22. This makes it possible to avoid a failure, for example, where the engine braking force of the forward first speed is prevented from acting under engine braking control in the forward second speed.

The hydraulic control system 1 is operated with engine braking control in the forward third speed as described below. Under the engine braking control, the linear solenoid valves SL1 and SL2, and the solenoid valve SR are OFF. The linear solenoid valve SL2 outputs the control pressure PSL2 to the oil passage 40. Responsive to supply of the control pressure PSL2 to the control oil chamber 16c, the brake control valve 16 gradually moves the spool 16a down.

At this time, the D range pressure of the first path is supplied to the input port x of the 3-4 shift valve 23, while no signal pressure S2 is supplied to the port w due to the ON state of the solenoid valve S2. Accordingly, the 3-4 shift valve 23 is in its left half position. As a result, the input port x is brought into communication with the output port m so that the D range pressure in the first path is output to the oil passage 24.

As the solenoid valve SR is in its OFF state, the signal pressure A is not output. Therefore, the clutch apply control valve 17 and the sequence valve 22 are both in the right half positions. The clutch apply control valve 17 cuts supply of the D range pressure of the second path, and outputs the D range pressure on the first path from the output port k to the input port b.

At this time, the brake control valve 16 is in its right half position as described above, and the input port j is in communication with the output port g. Accordingly, the brake control valve 16 outputs the engagement pressure B in accordance with the D range pressure of the first path from the output port g to the oil passage 41. As the 2-3 shift valve 19 is in its left half position, the engagement pressure B supplied to the input port t is output to the oil passage 52 via the output port s, and further supplied to the hydraulic servo 53 for the brake B-1 via the orifices 62, 65. The brake B-1 is thus engaged. The clutch C-1 (not shown) is engaged under direct control and the clutch C-3 and the brake B-3 are respectively engaged under the engagement pressures supplied via the valve (not shown). Therefore, the forward third speed with engine braking control is established.

The operation of the hydraulic control system 1 for establishing the forward fifth speed under the clutch-to-clutch shift control of 4-5/5-4 shifting will now be described. Referring to FIG. 2, the linear solenoid valve SL1 is switched to its ON state from its OFF state, and the linear solenoid valve SL2 is switched to its OFF state from its ON state, and the solenoid valve SR becomes ON. The linear solenoid valve SL2 is gradually opened from its closed state to output the modulator pressure Pmod to the oil passage 35 as the control pressure PSL that has been gradually increased. The control pressure PSL2 is supplied to the control oil chamber 16c of the brake control valve 16 so as to gradually move the spool 16a downward.

The D range pressure of the first path is supplied to the input port x of the 3-4 shift valve 23, and the signal pressure S2, in accordance with the OFF state (see FIG. 2) of the solenoid valve S2, is supplied to the port w. Accordingly, the 3-4 shift valve 23 is in its right half position. As a result, supply of the D range pressure of the first path to the input port x is interrupted.

As the solenoid valve SR is in its ON state, the signal pressure A is output such that the clutch apply control valve 17 and the sequence valve 22 are brought into their left half positions, respectively. The clutch apply control valve 17 outputs the D range pressure of the second path from the output port k to the oil passage 40.

The control pressure PSL2 is supplied to the control oil chamber 16c of the brake control valve 16 so as to output the engagement pressure B obtained by adjusting the D range pressure of the second path to the oil passage 41 from the output port g. The signal pressure S1 based on the OFF state (see FIG. 2) of the solenoid valve S1 is supplied to the port r of the 2-3 shift valve 19. Accordingly the 2-3 shift valve 19 is in its left half position. The engagement pressure B supplied to the input port t via the oil passage 41 is output from the output port s to the oil passage 52, and further supplied to the hydraulic servo 53 for the brake B-1 via the orifices 62, 65. As a result, the brake B-1 is engaged. At this moment, the clutches C-2, C-3 and the brake B-3 are engaged under the engagement pressure supplied through the valves (not shown) such that the forward fifth speed is established.

The control performed by the hydraulic control system 1 to maintain the engine braking force in the third speed, while preventing downshifting even if the shift lever is mistakenly moved to the second range position during vehicle running at high speeds in the third range, will now be described. Under the aforementioned control, a coast brake relay valve (not shown) is operated upon turning ON the solenoid valve SR, so as to cut supply of the D range pressure of the first path from the 3-4 shift valve 23. The position of the clutch apply control valve 17 is moved to the left half position upon turning ON of the solenoid valve SR so that the D range pressure of the second path is output form the output port k to the brake control valve 16.

As the 2-3 shift valve 19 is held in its left half position due to the OFF state of the solenoid valve S1, the engagement pressure B is supplied from the brake control valve 16 to the hydraulic servo 53 for the brake B-1 via the input port t and the output port s. As a result, the brake B-1 is engaged. This makes it possible to hold the engine braking in the forward third speed without engaging either brake B-2 or brake B-4.

Under hill-holding control in the neutral state, wherein all the clutches and brakes are disengaged, the hydraulic control system 1 is operated as described below. In the state where the vehicle is stopped in the D range, the clutch C-1 is disengaged, and the brake B-2 is engaged so as to provide hill-holding.

When the brake B-2 only is engaged in the neutral state, the ring gears R1, R2 can be fixed to the transmission case (shown as a hatched portion of FIG. 1). As the rotation of the carrier CR1 is restricted to one direction by the one-way clutch F-1, the reverse rotation of the ring gear R3 can be regulated. Engagement of the brake B-2, therefore, prevents reverse rotation of the output shaft 15, thus providing hill-holding.

In the hydraulic control system 1, wherein the D range pressure of the first path for the relatively lower shift speed is used as the source pressure, the clutch apply control valve 17 and the sequence valve 22 are brought to their left half positions in the state where the solenoid valve SR is ON. As a result, the vehicle is provided with hill-holding. The D range pressure of the second path is supplied from the output port k of the clutch apply control valve 17 to the input port j of the brake control valve 16. At this moment, the brake control valve 16 outputs the engagement pressure B from the output port g upon supply of the control pressure PSL2. As the 2-3 shift valve 19 is brought to its right half position with the solenoid valve S1 ON, the engagement pressure B is supplied to the input port v of the sequence valve 22 via the output port u. As the sequence valve 22 is in the left half position based on ON state of the solenoid valve SR, the engagement pressure B is supplied to the hydraulic servo 39 for the brake B-2 via the output port z. As a result, the brake B-2 is engaged to provide hill-holding, i.e., preventing the vehicle on an uphill slope from moving backward.

Although the hydraulic control system 1 has a simple structure in which the linear solenoid valve SL2, the brake control valve 16 and the like are grouped, the source pressure for the engagement pressure B, for engaging at least a required one of the brakes B-1, B-2, and B-4, is obtained from the oil pressure in the first path for the first, second, and third shift speeds (relatively lower speeds) supplied from the 3-4 shift valve 23, and from the oil pressure in the second path for the fifth speed (relatively higher speed), selectively. This makes it possible to establish the brake engagement necessary for applying engine braking force in the relatively lower speeds, and the brake engagement for gear shifting in the relatively higher speed.

In the fourth speed (lock-up stage), supply of the source pressure is interrupted by the 3-4 shift valve 23 and the clutch apply control valve 17, respectively. The brake to be released in the shifting operation can be reliably disengaged. The brake control valve 16 is capable of closing the output port g in accordance with the control pressure PSL2 supplied from the linear solenoid valve SL2. Accordingly, the output of the engagement pressure B in the fourth speed may be interrupted by operating the linear solenoid valve SL2 and the brake control valve 16 even if a failure occurs in the 3-4 shift valve 23 or in the clutch apply control valve 17, and the source pressure for the engagement pressure B is supplied to the brake control valve 16. More specifically, the brake control valve 16 serves to close the output port g in response to the control pressure PSL2 where the clutch apply control valve 17 is in its right half position (first position) in the fourth speed. As a result, even if a failure occurs in valve 23 and/or 17, the supply of the engagement pressure B as the source pressure in the fourth speed may be interrupted. This provides the hydraulic control system 1 with fail-safe control.

In the hydraulic control system 1, the clutch apply control valve 17 is operated upon supply or interruption of the signal pressure A by the solenoid valve SR. ON/OFF control of the solenoid valve SR makes it possible to select the shifting between the relatively lower speed and the relatively higher speed. The sequence valve 22 is operated in synchronization with the clutch apply control valve 17, in accordance with the signal pressure A based on which position of the clutch apply control valve 17 is selected. As a result, the circuit configuration can be simplified.

In the aforementioned embodiment, even if the 3-4 shift valve 23 outputs no hydraulic pressure in the first to the third speeds, the one-way clutch is engaged. In this case, as shown in FIG. 2, the engine braking force cannot be applied and the vehicle can be moved forward.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A hydraulic control system for an automatic transmission, the hydraulic control system comprising:
    a plurality of hydraulic servos for engaging and disengaging a plurality of friction engagement elements;
    a control device that supplies engagement pressure to the plurality of hydraulic servos;
    a first shift valve having a first port to which a source pressure is supplied from an oil pressure source and a second port, the first shift valve being selectively positioned in one of the first and second positions, said first position having said first port and said second port in communication in a first shift speed that is lower than a predetermined shift speed so that the source pressure is output from the second port, said second position blocking communication between the first port and the second port in a second shift speed that is different from the first shift speed, so that the source pressure is not output from the second port;
    a second shift valve having a third port in communication with said second port, a fourth port to which the source pressure is input without passage through the first shift valve, and a fifth port, the second shift valve being selectively positioned in one of third and fourth positions, said third position providing communication between the third port and the fifth port in a first speed and in the predetermined shift speed so that the source pressure supplied from the first shift valve is output from the fifth port, and the fourth position providing communication between the fourth port and the fifth port in a shift speed that is different from the predetermined shift speed so that the source pressure is output from the fifth port, wherein
    the control device includes a sixth port in communication with the fifth port, and a seventh port that outputs the source pressure received at the sixth port to one of the plurality of hydraulic servos as the engagement pressure.

2. The hydraulic control system according to claim 1, wherein the control device serves to close the seventh port when the second shift valve is in said third position in the predetermined shift speed.

3. The hydraulic control system according to claim 2, further comprising a first solenoid valve that selects the position of the second shift valve by supplying or interrupting supply of a signal pressure.

4. The hydraulic control system according to claim 3, further comprising a third shift valve having an eighth port to which the engagement pressure from the seventh port is supplied, a ninth port, and a tenth port, the third shift valve being selectively positioned in one of fifth and sixth positions, the fifth position providing communication between the eighth port and the ninth port responsive to receipt of the signal pressure from the first solenoid valve and output of the engagement pressure from the ninth port, the sixth position providing communication between the eighth port and the tenth port and output of engagement pressure from the tenth port.

5. The hydraulic control system according to claim 4, wherein
    the second shift valve is brought into the fourth position by receipt of the signal pressure from the first solenoid valve in an N-D control state, and the control device outputs the source pressure supplied to the fourth port as the engagement pressure from the seventh port, and supplies the engagement pressure output from the ninth port to one of the friction engagement elements serving to establish the predetermined shift speed higher than first speed, and
    the third shift valve is brought into the fifth position where the eighth port and the ninth port are in communication with each other and with an oil passage through which the engagement pressure is supplied to one of the friction engagement elements serving to establish the first speed with the second shift valve in the third position.

6. The hydraulic control system according to claim 5, wherein the one friction engagement element serving to establish the predetermined shift speed regulates reverse rotation of an output shaft of the automatic transmission.

7. The hydraulic control system according to claim 4, wherein the second shift valve is brought into the fourth position upon receipt of the signal pressure from the first solenoid valve, the third shift valve is in the sixth position where the engagement pressure is supplied to a predetermined friction engagement element and is brought into the fifth position when the eighth port and the ninth port are brought into communication, and the first shift valve is brought into the first position in the first speed and in the predetermined shift speed, and the control device outputs the source pressure supplied to the fourth port as the engagement pressure from the seventh port, and supplies the engagement pressure output from the ninth port to one of the friction engagement elements serving to establish engine braking engagement in the predetermined shift speed.

8. The hydraulic control system according to claim 3, wherein the second shift valve is brought into the fourth position when the fourth port and the fifth port are brought into communication upon receipt of the signal pressure from the first solenoid valve, and the engagement pressure is supplied to one of the friction engagement elements serving to establish a fifth speed when the second shift valve is brought into the fourth position, and the control device outputs the source pressure supplied to the fourth port as the engagement pressure from the seventh port and supplies the output engagement pressure to the one friction engagement element serving to establish the fifth speed.

9. The hydraulic control system according to claim 3, wherein the second shift valve is brought into the third position when the third port and the fifth port are brought into communication by the first solenoid valve interrupting supply of the signal pressure, and engagement pressure is supplied to one of the friction engagement elements serving to establish engine braking in third speed when the second shift valve is in the third position, and the control device outputs the source pressure supplied to the fourth port from the seventh port to the one friction engagement element serving to establish engine braking in the third speed.

10. The hydraulic control system according to claim 3 wherein the control device includes a control valve and a second solenoid valve that supplies control pressure to the control valve.

11. The hydraulic control system according to claim 1, wherein the predetermined shift speed is at a lock-up shift stage.

12. A hydraulic control system for an automatic transmission comprising:

a plurality of hydraulic servos engaging and disengaging a plurality of friction engagement elements serving to apply engine braking and to establish shift speeds;

a control device supplying engagement pressure to the plurality of hydraulic servos;

a first shift valve having a first port to which a source pressure as a predetermined oil pressure is supplied from an oil pressure source and a second port, the first shift valve being selectively positioned in one of first and second positions, the first position establishing communication between the first port and the second port for engine braking at a first shift speed, with the source pressure being output from the second port, and the second position blocking communication between the first port and the second port in a predetermined shift speed and in a second shift speed and preventing the source pressure from being output from the second port;

a second shift valve having a third port in communication with the second port, a fourth port to which the source pressure is input without being passed through the first shift valve, and a fifth port, the second shift valve being selectively positioned in one of third and fourth positions, the third position establishing communication between the third port and the fifth port in the first shift speed and in the predetermined shift speed, with source pressure supplied from the first shift valve being output from the fifth port, and the fourth position establishing communication between the fourth port and the fifth port in the second shift speed, with the source pressure being output from the fifth port, and wherein the control device includes a sixth port in communication with the fifth port, and a seventh port that outputs the source pressure supplied to the sixth port to the hydraulic servos as the engagement pressure.

* * * * *